Oct. 7, 1969 J. L. SMITH ET AL 3,471,836
ROTATIONAL MODE MAGNETIC FILM MEMORY
Filed Dec. 3, 1964 2 Sheets-Sheet 1

INVENTORS J. L. SMITH
E. M. TOLMAN
BY Herbert M. Shapiro
ATTORNEY

Oct. 7, 1969 J. L. SMITH ET AL 3,471,836
ROTATIONAL MODE MAGNETIC FILM MEMORY
Filed Dec. 3, 1964 2 Sheets-Sheet 2
FIG. 2
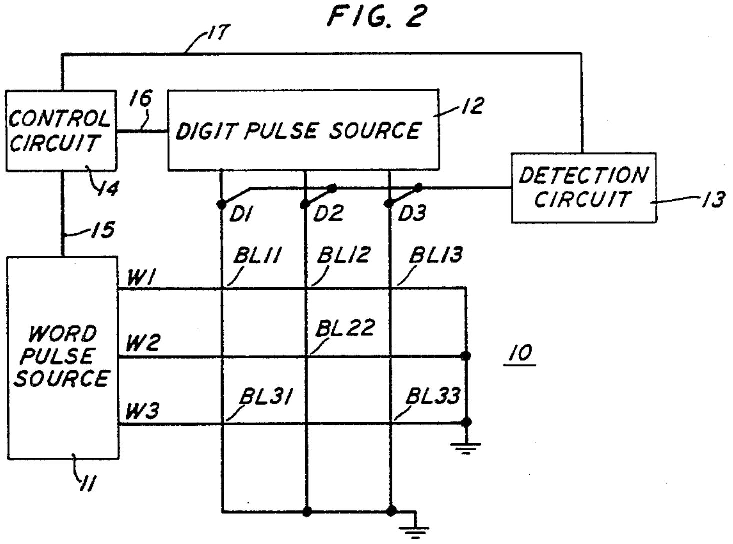
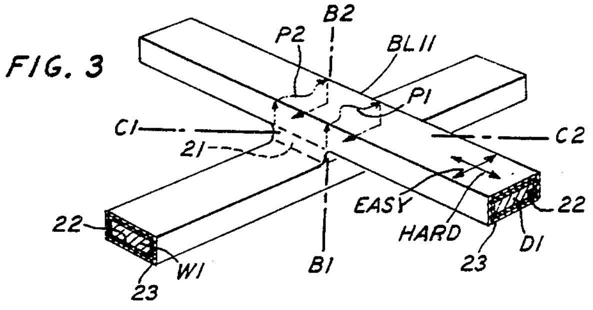
FIG. 4
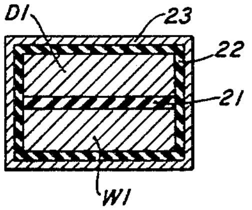
FIG. 5
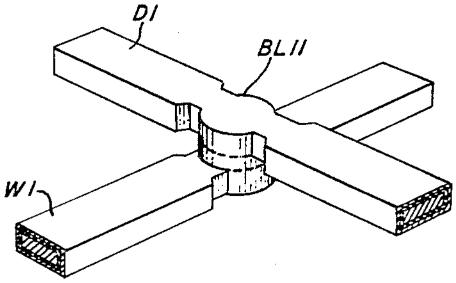

United States Patent Office 3,471,836

Patented Oct. 7, 1969

3,471,836

ROTATIONAL MODE MAGNETIC FILM MEMORY

James L. Smith, Bedminster, and Edward M. Tolman, Somerset, N.Y., assignors to Bell Telephone Laboratories, Incorporated, New York, N.Y., a corporation of New York Filed Dec. 3, 1964, Ser. No. 415,700
Int. Cl. G11b *5/00*
U.S. Cl. 340—174 4 Claims

ABSTRACT OF THE DISCLOSURE

A thin magnetic film memory matrix is described. Intersections between orthogonal sets of drive conductors are provided with flux closure paths for flux rotated in thin films about the intersections. A method for fabricating the matrix is also described.

This invention relates to magnetic memories. More particularly, this invention relates to the method for fabricating thin film magnetic memories including closed flux paths for flux therein and to the memories fabricated thereby.

It may be said, in general, that open flux magnetic structures would benefit if closed flux paths were provided for flux therein because of an accompanying reduction both in the amplitude of drive currents applied thereto and in the demagnetizing fields thereabout. In this connection, the term "open flux" describes any magnetic structure wherein flux closes through air.

One open flux structure is the well known thin film memory wherein a thin anisotropic magnetic film is deposited on a nonmagnetic support member, for example, glass, and insulated orthogonally disposed drive conductors are formed thereover. This thin film structure is operated in the rotational mode. In this connection, the rotational mode of operation requires an anisotropic magnetic material having a hard and an easy axis. Binary information is stored as first and second directions of flux along the easy axis. The writing of information into a selected bit location in this mode of operation requires a relatively large current pulse on a first associated conductor to rotate flux in the selected bit location into the hard direction, and a tipping pulse, applied to a second associated conductor, to select the direction of flux along the easy axis as that first mentioned pulse is terminating. Read out is accomplished by again rotating flux to the hard direction and detecting the polarity of the voltage induced in the second conductor. Since variations both in the described write and the read operations are well known and, since it is intended herein not to be limited to the illustrative mode of operation, the term "rotational mode" is used to indicate any mode of operation wherein flux changes take place by rotation rather than by domain wall motion. Such a mode of operation is particularly desirable because it provides relatively high switching speeds.

Various attempts have been made to provide closed flux paths for thin film devices, or, at least, to reduce the length of the path through air. One technique is to plate a second magnetic film over insulated drive conductors. This has been largely unsatisfactory because of the variable and generally poor quality of the junctions formed at the edges of the film. Specifically, gaps are formed between the two films, and the gaps are neither controllable nor predictable. Another technique is to space apart two thin films not only by drive conductors but by an additional insulating layer of uniform thickness. The latter technique, of course, fails to provide completely closed flux paths.

It is an object of this invention to provide a method for fabricating closed flux thin film magnetic devices operable in the rotational mode.

Another object of this invention is to provide a new and novel closed flux magnetic structure.

The foregoing and further objects of this invention are realized in one embodiment where, in accordance with method aspects thereof, a nonmagnetic electrically insulating sheet, including a copper layer on each of its faces, is processed to form of these copper layers first and second sets of conductors positioned orthogonally with respect to one another and defining intersections therebetween. The insulating sheet is substantially etched away leaving thereof insulating spacers at the intersections to space apart the conductors there. The resulting structure is coated with nonmagnetic electrically insulating material and, finally, with a coating of anisotropic magnetic material having an easy axis peripherally about the conductors of one set of conductors. In this manner, there is provided a magnetic structure comprising anisotropic material and having closed flux paths for flux induced therein by currents in selected ones of said first and second sets of conductors.

Accordingly, a feature of this invention is the step of coating orthogonally positioned first and second sets of insulated conductors with anisotropic magnetic material having an easy axis peripherally about the conductors of the first set.

Another feature of this invention is a memory including orthogonal first and second sets of conductors defining intersections therebetween wherein each intersection and the conductors defining the intersection have deposited thereabout a thin magnetic film which provides first and second closed magnetic flux paths.

The foregoing and further objects and features of this invention will be understood more fully from a consideration of the following detailed description rendered in conjunction with the accompanying drawing wherein:

FIG. 2 is a schematic view of an illustrative word-organized memory in accordance with this invention;

FIG. 3 is an enlarged plan view of one form for a portion of the memory of FIG. 2 taken at a representative bit location thereof;

FIG. 4 is a cross-sectional view of the portion of FIG. 3; and

FIG. 5 is an enlarged plan view of an alternative form for a portion of the memory of FIG. 2 taken at a representative bit location thereof.

Figure 1:
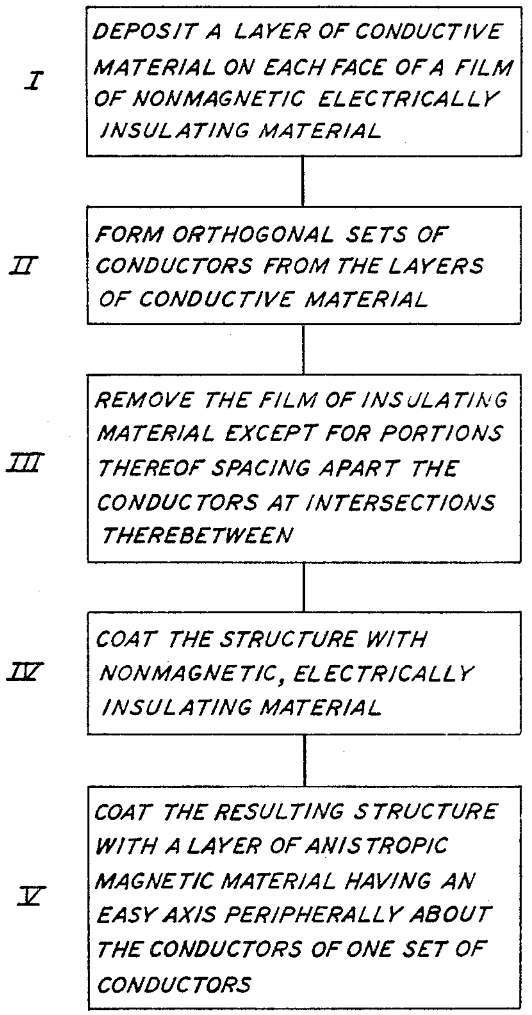
FIG. 1 is a flow diagram illustrating the steps of a method in accordance with this invention.

A method for realizing a closed flux structure in accordance with this invention is discussed in connection with FIG. 1. Specifically, a starting material may be a sheet of any nonmagnetic electrically insulating material such as a plastic material, for example, Mylar. A layer of any electrically conducting material such as copper is deposited by well known techniques on each face of the Mylar sheet. This step is represented by block I of FIG. 1. A typical Mylar sheet is about one by one inch by 1.25 mil (one mil equals 0.001 inch) thick and the copper layers are typically 0.5 mil thick. Copper clad Mylar sheets suitable in accordance with this invention are available commercially. Each copper layer is converted into separate, substantially parallel copper conductors by well known photo-resist techniques. The conductors on one face of the Mylar are formed substantially orthogonal to those on the other face. This step is represented by block II of FIG. 1. Alternatively, the copper conductors may be formed directly by plating or evaporating copper selectively. The insulating film then is substantially removed as called for in block III of FIG. 1.

This removal is accomplished, conveniently, by dipping the structure in a suitable etchant for a time and at a temperature to etch away all but the Mylar partially protected by the conductors at the intersections therebetween. The resulting structure then is coated with a nonmagnetic layer, typically a phenolic-type laminating varnish as called for in block IV of FIG. 1. The final step of the method, represented by block V of FIG. 1, is to coat the resulting structure with a layer of anisotropic magnetic material. This step is carried out, conveniently, by well known electro- or, alternatively, electroless-plating techniques during which a current is applied to one set of conductors for providing a magnetic field peripherally about each conductor in that set. In this manner the prerequisite anisotropy is provided. If electro-plating techniques are employed, a flash coating of copper is deposited first, by well known techniques, and a permalloy is plated thereon. In this connection, permalloys are well known alloys of nickel and iron. If electroless techniques are employed, nickel-cobalt alloys are used without the flash coating of copper.

A structure in accordance with this invention is fabricated, for example, from a sheet of Mylar having 0.5 mil thick copper layers thereon. The Mylar sheet is one by one inch by 1.25 mils thick. Orthogonal sets of conductors are formed from the copper layers by well known photo-resist techniques. The conductors are three mils wide by 0.25 mil thick. The structure is dipped in concentrated sulfuric acid (between 80 and 98 percent by weight) at a temperature of about 140 degrees Fahrenheit for one-half minute, removing all the Mylar except that between the conductors. Subsequently, the structure is dipped in a 50–50 (by volume) solution of phenolic-type laminating varnish (Union Carbide Plastics Co., BLS–2700) and ethyl alcohol at a temperature of 50 degrees and drained, providing a coating about 0.000070 inch thick. This step is carried out in a "dip coater" and the rate of withdrawal of the structure therefrom is selected less than the draining speed to insure a uniform coating as is well known. The resulting structure is placed in an electroless copper solution at room temperature for fifteen minutes to give a flash of copper. Then, the structure is placed in a suitable nickel-iron sulfate premalloy plating solution such as a solution comprising 218 g./l. (grams per liter) $NiSO_4 \cdot 6H_2O$, 4 g./l. $FeSO_4 \cdot 7H_2O$, 25 g./l. boric acid, 9.7 g./l. NaCl, and 0.83 g./l. saccharin, at a temperature of 40 degrees centigrade and 150 milliamperes of current per square centimeter for ten seconds in the presence of a current of 300 milliamperes applied to the conductors of one set. A micron ($10^{-6}$ inch) of permalloy (nickel-iron 80–20 percent by weight) is deposited.

The magnetic structure resulting from the method of FIG. 1 comprises a matrix of intersecting coated conductors which provide at each intersection therebetween hard and easy axes for flux in the magnetic material thereabout and which provide, further, orthogonal flux paths which enhance operation of the structure in the rotational mode.

FIG. 2 depicts an illustrative word-organized memory wherein that magnetic structure is operated in the rotational mode. The organization of the memory will be discussed first. Then the structure of a portion of the memory at a representative bit location will be discused, with reference to the method of FIG. 1, along with the storage and read out of a binary "1" and a binary "0" therein. Thereafter the storage of an illustrative binary word 101 will be discussed briefly with respect to representative bit locations of the memory.

The memory 10 of FIG. 2 comprises, illustratively, first and second sets of conductors W1, W2, and W3, and D1, D2, and D3, respectively. The designations "W" and "D" stand for "word" and "digit" in the parlance of word-organized memories. Each of the word conductors is connected between a word pulse source 11 and ground. Similarly, each of the digit conductors is connected between a digit pulse source 12 and ground. Also, the digit conductors are connected to detection circuit 13. Pulse sources 11 and 12 and detection circuit 13 are connected to a control circuit 14 by conductors 15, 16, and 17, respectively. The sets of conductors are oriented substantially orthogonally with respect to one another, defining intersections therebetween. These intersections are designated BL, as explained hereinafter, and the designation includes, in each instance, numerals corresponding to the word and digit conductors, respectively, defining the designated intersection.

FIG. 3 illustrates a representative intersection BL11 of the memory of FIG. 1. The intersecting conductors W1 and D1 are shown spaced apart by a plastic spacer 21. Further, the conductors and the spacer are shown coated by nonmagnetic layer 22 and magnetic layer 23. The plastic spacer 21 and the layers 22 and 23 are formed in accordance with blocks III, IV, and V of FIG. 1, respectively. A cross section of the intersection taken along a diagonal B1–B2 or, alternatively, C1–C2 is shown in FIG. 4. Both the nonmagnetic layer 22 and the magnetic layer 23 are shown completely encomposing the conductors and the plastic spacer therebetween.

Block V of FIG. 1 indicates that an easy axis is formed peripherally about the conductors of one set. FIG. 3 shows that the easy axis is peripherally about a digit conductor. As is stated hereinbefore, information is stored in a bit location of a memory operated, generally, in the rotational mode as flux in first and second directions along the easy axis. In the memory of FIG. 1, information is stored at an intersection as first and second directions of flux peripherally about the digit conductor. Accordingly, the magnetic material about the digit conductor at an intersection constitutes a bit location and the magnetic material about the word and digit conductors provides orthogonal closed flux paths for flux, respectively, in the hard and the easy directions there. For simplicity, the entire intersection is designated BL because the bit location is located there.

In operation, a relatively high amplitude current pulse is applied to conductor W1 by word pulse source 11 under the control of control circuit 14. In this connection, the various pulse sources, the control circuit, and the detection circuit may be any sources or circuits capable of operation in accordance with this invention. The applied pulse, termed a word pulse, provides a magnetomotive force which rotates flux directed peripherally about the digit conductor into the axis of the digit conductor. As the word pulse is terminating, a smaller pulse, termed a digit pulse, is applied to digit conductor D1 by digit pulse source 12 under the control of control circuit 14. The digit pulse is of a positive or negative polarity to tip the flux, respectively, to the counterclockwise or to the clockwise direction about the digit conductor at the bit location. The directions are taken as viewed from right to left along the digit conductor D1 as shown in FIG. 3. In this connection, the term "positive" defines a pulse wherein conventional current flows from a source; "negative" defines a pulse wherein current flows toward a source. In response to a later positive word pulse, positive and negative pulses are induced in the digit conductor for counterclockwise and clockwise stored flux, respectively. These outputs are detected by detection circuit 13.

We may arbitrarily select the positive output and, so, the counterclockwise flux as representing a binary "1," and the negative output and clockwise flux as representing a binary "0." Accordingly, the illustrative word 101 is stored in bit locations BL11, BL12, and BL13, respectively, by applying a word pulse to conductor W1 and by applying positive digit pulses to conductors D1 and D3 and a negative digit pulse to conductor D2 as that word pulse terminates. In response to a later word pulse, positive pulses are induced in digit conductors D1 and D3 and a negative pulse is induced in digit conductor D2 for parallel detection thereof by detection circuit 13. Read out is destructive in the illustrative operation.

It has been indicated hereinbefore that the bit location is in the magnetic material about the digit conductor at an intersection in the magnetic structure in accordance with this invention. This follows from the fact that although the word pulse generates a magnetomotive force peripherally about the selected word conductor all along its length, the magnetomotive force generated by that pulse effects flux in the magnetic coating of the digit conductor only at the intersections. The termination of the word pulse permits flux at the intersections to relax to the easy direction, flux closure for that flux being peripherally about the digit conductor. Because of the position of the word conductor and the field thereabout, it is believed that flux in accordance with this invention closes in the easy direction in two spaced apart paths slightly distorted in the area of the bit location. These paths are illustrated by the broken lines designated P1 and P2 in FIG. 3. The same appears true for the paths for flux in the hard direction. Flux in the hard direction, however, closes about the word conductor. It may be appreciated that, regardless of the shape of the paths, flux rotated to any angle, in accordance with this invention, does find a closed flux path. For example, flux rotated to 45 degrees finds closed flux paths through the layer 23, as shown in FIG. 4, or about the digit conductor, or both.

A second embodiment in accordance with this invention is shown in FIG. 5. In that figure, the conductors at the intersections are shaped circularly to reduce any sharp corners which might otherwise be present during the deposition of the magnetic overlay and to provide desirably smoother surfaces for the deposited materials. Further, FIG. 5 shows that the conductors are of reduced cross section at the limits of the intersection. This might appear in the embodiment of FIG. 3 as an enlargement in the cross section of the conductors except at the intersections. The reason for the difference in cross section is that successive applications of digit pulses generally have a tendency to cause domain wall creep. If such domain wall creep were to occur herein, it would be limited to the vicinity of the intersection because of a substantial increase in the magnetic path (and an accompanying decrease in the field there) about the digit conductors at distances therealong just removed from the intersection.

A portion of the conductor removed from the intersections typically has a width twice that of a portion thereof at the limits of the intersection.

What have been described here are considered to be only illustrative embodiments according to the principles of this invention, and it is to be understood that numerous other arrangements may be devised by one skilled in the art without departing from the spirit and scope thereof.

What is claimed is:

1. A magnetic memory comprising first and second sets of electrical conductors positioned orthogonally to form a matrix of intersections therebetween, said first and second sets of electrical conductors being spaced apart at each of said intersections by a nonmagnetic insulating spacer, said first and second sets of electrical conductors and said intersections including thereabout both a layer of nonmagnetic material and an overlay of magnetically retentive material having an easy axis peripherally about each of said first set of conductors.

2. A magnetic memory in accordance with claim 1 wherein said electrical conductors have circular configurations at the intersections and wherein the width of the conductors is decreased at short distances from the intersections.

3. A magnetic memory in accordance with claim 2 wherein said nonmagnetic insulator spacer is Mylar.

4. A magnetic memory in accordance with claim 2 wherein said magnetically retentive film is an alloy of nickel and iron.

References Cited

UNITED STATES PATENTS

| | | | |
|---|---|---|---|
| 3,229,265 | 1/1966 | Brownlow et al. | 340—174 |
| 3,278,913 | 11/1966 | Raffel | 340—174 |
| 3,375,503 | 3/1968 | Berrelsen | 340—174 |
| 3,055,770 | 9/1962 | Sankuer et al. | 340—174 |
| 3,139,608 | 6/1964 | Doughty | 340—174 |
| 3,213,430 | 10/1965 | Oshima et al. | 340—174 |
| 3,233,228 | 2/1966 | Kaspar | 340—174 |
| 3,276,000 | 9/1966 | Davis | 340—174 |
| 3,348,061 | 10/1967 | Oshima et al. | 340—174 |

BERNARD KONICK, Primary Examiner

V. C. CANNEY, Assistant Examiner

U.S. Cl. X.R.

29—604